UNITED STATES PATENT OFFICE.

HANS BARDT, OF SANTIAGO, CHILE, ASSIGNOR TO SOCIEDAD HIDRO-METALURGICA, OF SANTIAGO, CHILE, A CORPORATION OF CHILE.

ELECTRIC STORAGE BATTERY.

1,425,163.      Specification of Letters Patent.      Patented Aug. 8, 1922.

No Drawing.      Application filed September 17, 1921. Serial No. 501,421.

*To all whom it may concern:*

Be it known that I, HANS BARDT, citizen of Germany, residing at Santiago, Chile, have invented certain new and useful Improvements in Electric Storage Batteries, of which the following is a specification.

With electric storage batteries it is most essential, that a maximum output (in kilowatts) can be reached with a minimum weight of accumulator-cell.

The electric storage batteries in use (the lead as well as the Edison type of battery) contain holders for the active material, the manufacture of which is complicated and costly, apart from the disadvantage that they add considerably to the dead weight of the cell. Besides, the plate-structure in a lead battery is very sensitive to extreme discharges or overcharges, and, at any rate, the plates only last for a reasonable length of time, when treated with very great care and under the conditions that all rules for their safe working are strictly observed. The types in vogue, however, only yield a discharge-current of an average strength of 0.7 amperes per square decimeter of electrode area.

It has been shown that it is possible to considerably improve the output and life of storage batteries; to eliminate the use of independent holders; furthermore, to raise the strength of the discharge-current up to 1.0 and 2.0 amperes per square decimeter of electrode-area; and finally, to raise the capacity, (i. e. kilowatt-yield in relation to cell-weight) obtaining an increase of about 100%, by employing a new electrolyte and suitable electrodes, adequately arranged in horizontal position.

As electrolyte, solutions of the perchlorates of those metals can be employed, which, when in a pure state and under normal conditions, are inert with respect to perchloric acid as well as to its salts. Analogously, suitable electrodes are made of metals or metallic alloys, which are not attacked by perchloric acid or its salts, as for instance, of ferro-silicon-alloys.

If, for instance, solutions of perchlorate of lead or of copper are employed, as much lead oxide is put on to the positive electrode (which is horizontally placed at the bottom of the vat) as corresponds to the metal which is deposited from the solution at the cathode when the cells are being charged, i. e. as corresponds to the metal-content of the solution.

When charging, the lead oxide is transformed into peroxide, the quantity formed corresponding to the metal deposited at the cathode. While discharging, lead-ions from the negative electrode enter the solution and lead oxide is regenerated at the positive electrode, in the same proportion.

In this procedure, a discharge current of an extremely high intensity is produced, i. e. of 2.0 amperes per square decimeter of electrode-area.

The following example may serve as an illustration of the above:

Into a vat with a horizontal bottom-electrode of ferro-silicon or into a bowl-shaped vessel made of the same material, a solution of perchlorate of lead or copper is introduced, of a concentration of 10% of lead or 13% of copper, respectively. Then, a certain quantity of lead-oxide corresponding to the metal content and volume of the electrolyte is put on to the bottom-electrode.

After introducing the negative electrode, which may be made of lead, copper or ferro-silicon, the accumulator thus constructed, is charged, employing a current-density of 1.5 ampere per square decimeter of electrode-area.

Claims:

1. An electrolyte for storage batteries which consists of a metallic perchlorate solution.

2. An electrolyte for storage batteries which consists of a solution of perchlorate of lead.

3. An electric storage battery comprising an electrolyte of a perchlorate solution, a negative electrode of a ferro-silicon alloy and a positive electrode having a coating of lead oxide.

In testimony whereof I affix my signature.

HANS BARDT.

Witnesses:
WALTER J. TINGLE,
R. MARNECKER.